(12) United States Patent
Rietzler et al.

(10) Patent No.: US 11,173,946 B2
(45) Date of Patent: Nov. 16, 2021

(54) STEERING COLUMN FOR A MOTOR VEHICLE

(71) Applicants: thyssenkrupp Presta AG, Eschen (LI); thyssenkrupp AG, Essen (DE)

(72) Inventors: Oliver Rietzler, Vienna (AT); Tassoh Kpekpasse, Altstätten (CH); Benjamin Deeg, Dornbirn (AT)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 0 days.

(21) Appl. No.: 16/754,242

(22) PCT Filed: Oct. 19, 2018

(86) PCT No.: PCT/EP2018/078738
§ 371 (c)(1),
(2) Date: Apr. 7, 2020

(87) PCT Pub. No.: WO2019/081373
PCT Pub. Date: May 2, 2019

(65) Prior Publication Data
US 2021/0031824 A1 Feb. 4, 2021

(30) Foreign Application Priority Data
Oct. 24, 2017 (DE) ..................... 10 2017 219 014.0

(51) Int. Cl.
*B62D 1/19* (2006.01)
*B62D 1/184* (2006.01)
*B62D 1/187* (2006.01)
(52) U.S. Cl.
CPC ............. *B62D 1/195* (2013.01); *B62D 1/184* (2013.01); *B62D 1/187* (2013.01)

(58) Field of Classification Search
CPC ......... B62D 1/195; B62D 1/184; B62D 1/187
See application file for complete search history.

(56) References Cited

U.S. PATENT DOCUMENTS 7,963,561 B2 * 6/2011 Waibel ................... B62D 1/184
  280/777
8,438,944 B2 * 5/2013 Ridgway ................ B62D 1/195
  74/493

(Continued)

FOREIGN PATENT DOCUMENTS

DE  10 2005 052 123 B  1/2007
DE  10 2005 053 123 B  5/2007

(Continued)

OTHER PUBLICATIONS

English Translation of International Search Report issued in PCT/EP2018/078738, dated Jan. 25, 2019.

*Primary Examiner* — Drew J Brown
(74) *Attorney, Agent, or Firm* — thyssenkrupp North America, LLC

(57) ABSTRACT

A steering column may include an actuating unit with a steering spindle rotatably mounted about its longitudinal axis in a casing tube, a support unit in which the actuating unit can be received, and an energy absorbing device that includes a transmission element that is supportable on the support unit and an energy absorbing element secured to the actuating unit. In a crash event, the transmission element is movable in a direction of the longitudinal axis relative to the plastically-deformable energy absorbing element. The energy absorbing element has an elongated hole parallel to the longitudinal axis and into which an expansion part of the transmission element that is oversized relative to the elongated hole engages. The energy absorbing element may be (Continued)

connected to the actuating unit via a securing element that engages in securing recesses of the energy absorbing element and of the casing tube.

12 Claims, 3 Drawing Sheets

(56) References Cited

U.S. PATENT DOCUMENTS

| | | | | |
|---|---|---|---|---|
| 8,678,437 | B2* | 3/2014 | Narita | F16F 7/123 |
| | | | | 280/777 |
| 9,428,213 | B2* | 8/2016 | Tinnin | B62D 1/195 |
| 9,969,421 | B2 | 5/2018 | Klepp | |
| 10,023,222 | B2* | 7/2018 | Tinnin | B62D 1/192 |
| 10,654,516 | B2* | 5/2020 | Paltinisanu | B62D 1/195 |
| 10,676,120 | B2* | 6/2020 | Abou Alam | B62D 1/181 |
| 2007/0194563 | A1* | 8/2007 | Menjak | B62D 1/195 |
| | | | | 280/777 |
| 2012/0266716 | A1* | 10/2012 | Sulser | B62D 1/184 |
| | | | | 74/493 |
| 2015/0314801 | A1* | 11/2015 | Gstohl | B62D 1/195 |
| | | | | 74/493 |
| 2015/0375767 | A1* | 12/2015 | Agbor | B62D 1/181 |
| | | | | 74/493 |
| 2016/0159387 | A1* | 6/2016 | Okano | B62D 1/184 |
| | | | | 74/493 |
| 2018/0050719 | A1* | 2/2018 | Agbor | B62D 1/184 |
| 2018/0265116 | A1* | 9/2018 | Sulser | B62D 1/195 |
| 2018/0297626 | A1* | 10/2018 | Huber | B62D 1/192 |
| 2018/0354546 | A1 | 12/2018 | Kreutz | |
| 2019/0315386 | A1 | 10/2019 | Paltinisanu | |

FOREIGN PATENT DOCUMENTS

| | | | |
|---|---|---|---|
| DE | 10 2009 059 159 B | | 1/2011 |
| DE | 10 2012 100 626 B | | 2/2013 |
| DE | 10 2012 109 079 A | | 3/2014 |
| DE | 10 2015 204 476 B | | 5/2016 |

* cited by examiner

STEERING COLUMN FOR A MOTOR VEHICLE

CROSS REFERENCE TO RELATED APPLICATIONS

This application is a U.S. National Stage Entry of International Patent Application Serial Number PCT/EP2018/078738, filed Oct. 19, 2018, which claims priority to German Patent Application No. DE 10 2017 219 014.0, filed Oct. 24, 2017, the entire contents of both of which are incorporated herein by reference.

FIELD

The present disclosure generally relates to steering columns, including steering columns for motor vehicles.

BACKGROUND

The invention relates to a steering column for a motor vehicle, comprising an actuating unit with a steering spindle which is mounted such that it can be rotated about its longitudinal axis in a casing tube, a support unit which can be connected to the body of the motor vehicle and in which the actuating unit can be accommodated, and an energy absorbing device, which has a transmission element that can be supported on the support unit and an energy absorbing element that is secured to the actuating unit, wherein, in the event of a crash, the transmission element can be moved in the direction of the longitudinal axis relative to the energy absorbing element, with plastic deformation of the energy absorbing element, wherein the energy absorbing element has an elongated hole which is oriented parallel to the longitudinal axis and into which an expansion part of the transmission element that is oversized relative to the width of the elongated hole engages.

Via the steering wheel attached to the rear end of the steering spindle with respect to the direction of travel, a steering torque for steering the vehicle can be introduced by the driver as a steering command. The casing tube, together with the steering spindle rotatably mounted therein, forms the actuating unit, which is held on the vehicle body in a support unit, for example in a bracket unit. During operation, the actuating unit can be connected in a fixed position to the support unit or, in order to adjust the steering wheel position relative to the support unit connected in a fixed manner to the vehicle body, can be configured such that it can be adjusted in the vertical direction and/or in the longitudinal direction, the latter corresponding to the direction of the longitudinal axis, into a release position of an adjusting device and fixed releasably in a fixing position.

To increase the occupant safety in a vehicle collision, a so-called crash, in a generic steering column what is known as a crash device is provided with an energy absorbing device. A crash device is implemented by the actuating unit also being movable forward in the longitudinal direction relative to the support unit fixed to the body, even in the fixing position, if the body of the driver strikes the steering wheel during a frontal collision at high speed, a high force which exceeds a limiting value and which occurs only in the event of a crash being exerted on the steering wheel. In order to ensure controlled braking of the body striking the steering wheel, an energy absorbing device is coupled in between the casing unit and the support unit which, during normal operation, are normally fixed to each other releasably by the clamping device of an adjusting device but in the event of a crash can be moved relative to each other, overcoming the fixing force. Said energy absorbing device converts the kinetic energy introduced between casing unit and actuating unit into plastic deformation of an energy absorbing element via a predefined deformation path, for example by expanding an elongated hole or slot, tearing apart a tearing element, bending a bending element, or combinations of various deformations.

In a generic steering column, such as is known from DE 10 2005 052 123 B3, for example, an energy absorbing element which has an elongated hole parallel to the longitudinal axis fixed to the actuating unit. A transmission element supported on the support unit engages with an expansion part in the elongated hole of the energy absorbing element fixed to the actuating unit. In the event of a crash, said expanding part, which is wider than the elongated hole, is moved along in the elongated hole and expands the latter with plastic deformation over its length, which corresponds to the deformation path, absorbing energy. If the energy absorbing element is fixed by means of welding, thermal distortion may occur, which can impair the energy absorption characteristics.

Thus a need exists for an improved attachment of the energy absorbing element to the actuating unit.

DETAILED DESCRIPTION

Figure 1:
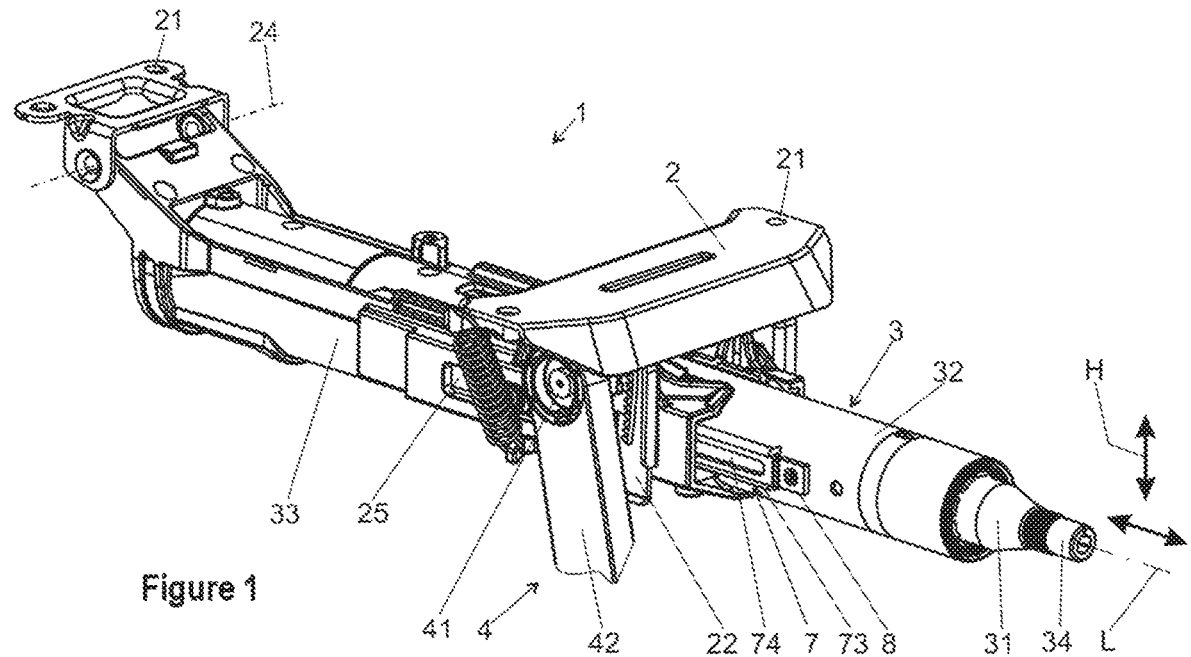
FIG. 1 is a schematic perspective view of an example steering column.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

In some examples, the energy absorbing element may be connected to the actuating unit via at least one securing element, which engages in securing recesses of the energy absorbing element and of the casing tube.

According to the invention, at least one securing element is provided, which can preferably initially be provided as a separate connecting element and to be fixed is inserted and fixed in corresponding securing recesses in the energy absorbing element and the casing tube. The securing recesses can, for example, be formed by overlapping, preferably congruent, securing openings, through which a pin-like or bolt-like securing element is led transversely with respect to the longitudinal axis. Preferably, a securing element is fitted in the securing recesses, for example securing openings, in a form-fitting manner, so that it produces a connection between the energy absorbing element and the actuating unit which is play-free in the longitudinal direction.

Alternatively, provision can preferably also be made for the securing elements to be formed as a section of the energy absorbing element or of the casing tube, wherein said sections are brought into engagement with the securing recesses by means of plastic deformation. This section can preferably be formed as lugs with a free end.

The energy absorbing element has an elongated hole oriented parallel to the longitudinal axis, in which an expanding part of the transmission element that is oversized relative to the width of the elongated hole engages. Such an energy absorbing element, in which the active deformation length of the deformation section is predefined by the length of the elongated hole in the direction of the longitudinal axis, is known, for example from DE 10 2005 052 123 B3 mentioned at the beginning. According to the invention, the fixing to the casing tube is carried out by means of securing elements. It is particularly advantageous that the elongated hole is spaced apart radially from the casing tube, and at least one securing recess is formed in a fixing lug lying against the casing tube As a result of the elongated hole spaced apart relative to the outer surface of the casing tube, the expanding part can reach through completely, so that, in the event of a crash, it is moved through the elongated hole with secure guidance in the longitudinal direction and expands said elongated hole plastically. The securing lugs can be formed as flat sections, which each have one or more securing recesses, for example securing holes. Viewed from the elongated hole, the securing lugs are offset in the direction of the casing tube, so that they lie against the outer surface of the casing tube, while the deformation section with the elongated hole is spaced apart radially from the casing tube. Accordingly, the securing lugs have a radial spacing from the elongated hole with respect to the longitudinal axis. Preferably, the securing lugs are arranged at a distance from the elongated hole in the direction of the longitudinal axis, for example in front of and behind the deformation section in the longitudinal direction. The securing lugs can also project laterally, transversely with respect to the longitudinal axis, so that the securing recesses formed therein are spaced apart from the elongated hole transversely with respect to the longitudinal axis.

Preferably, a plurality of securing elements are used.

One advantage is that the securing recesses can be formed in the energy absorbing element and the casing tube with the required accuracy by material removing or non-material removing machining methods, for example by punching or drilling, and a connection being made only in a subsequent manufacturing step by insertion of the securing element or elements. This ensures that the shape of the energy absorbing element that is critical for the function is not adversely affected by the fixing to the actuating unit.

A securing element can be formed as a plastically deformable, non-detachable connecting element, for example as a rivet. For a riveted connection, the rivet can be inserted into the securing recess in a manner known per se and riveted by plastic deformation, so that a form-fitting, non-detachable connection is produced. Preferably, the rivet can be inserted substantially in the radial direction, transversely with respect to the longitudinal direction. The rivet or the rivets define the energy absorbing element in the transverse and longitudinal direction of the casing tube. The rivet heads can preferably be countersunk. To this end, a depression which accommodates the rivet head flush is formed in the region of the securing recess. The fact that the rivet does not project out of the depression means that a level continuous surface is obtained in the region of the riveting.

At least two securing elements can be arranged on a line parallel to the longitudinal axis. As a result, firstly the energy absorbing element can be fixed securely to the casing tube, secondly, by means of two or more securing elements, the axial forces acting on the energy absorbing element in the event of a crash can be absorbed safely.

At least two securing elements can be arranged on a line parallel to the longitudinal axis. As a result, a durable fixing in the longitudinal direction can be implemented.

An advantageous embodiment of the invention provides for the securing elements to be arranged on at least one securing section of the energy absorbing element outside a deformation section, preferably with a spacing in the direction of the longitudinal axis and/or transversely with respect to the longitudinal axis. The deformation section forms part of the energy absorbing element that is deformed in the event of a crash. For example, this can be the longitudinal section in which an expandable elongated hole extends. As a result of the securing elements arranged outside the deformation section, the deformation can take place uninterruptedly in the event of a crash, and the connection between energy absorbing element and casing tube is not damaged. In addition, the number and arrangement of the securing sections can be matched to the high forces to be expected in the event of a crash, the stylistic freedom during the design not being restricted by the dimensions of the deformation section.

The securing sections in the form of securing lugs can be positioned on the energy absorbing element such that they are easily accessible for assembly by inserting the fixing elements, the deformation section is as far as possible not deformed or distorted in a damaging way during the assembly, and that the high loadings of the connection occurring in the event of a crash are safely absorbed.

Preferably, the energy absorbing element can be formed as a one-piece punched and bent molding, for example from sheet steel. As a result, for example, a deformation section having an elongated hole, and adjoining securing lugs angled over thereon in the form of steps and having securing holes can be produced logically with the required tolerances by cold forming as a sheet metal molded part Furthermore, the energy absorbing element can have at least one form-fitting element, which engages in a form-fitting manner in a corresponding form-fitting recess in the casing tube. A formfitting element can, for example, have a protrusion, for example a projecting edge section of a sheet metal molding which, from the outside, radially in relation to the longitudinal axis, is inserted in a form-fitting manner in a corresponding opening or recess in the casing tube. As a result of the form fit, the energy absorbing element is positioned and fixed parallel and transversely with respect to the longitudinal axis during assembly, so that the required exact alignment and the introduction of the securing elements is made easier. In addition, the form fit can absorb the forces occurring in the direction of the longitudinal axis in the event of a crash. In a corresponding way, the securing elements according to the invention substantially have to ensure only the radial fixing of the energy absorbing element to the casing tube. As a result, the security of the fixing is increased, and smaller securing elements can be used in order to optimize the overall space and to simplify manufacture.

Provision can be made for the transmission element and the energy absorbing element to be connected to each other by an intended fracture element. The intended fracture element ensures that, under the loadings to be expected in normal operation, the energy absorbing device does not respond and, even in the long term, the energy absorbing characteristics are not adversely affected. The intended fracture element is broken and the relative movement of transmission element and energy absorbing element for energy absorption is released only by the high force peaks occurring in the event of a crash. The intended fracture element can, for example, be implemented by a shear pin or shear rivet, which is inserted into a transverse hole going through the transmission element and the energy absorbing element and is sheared off in the longitudinal direction in the event of a crash.

The transmission element can have an engagement part, which can be detachably connected to a locking part that can be supported on the support unit. The engagement part can be, for example, a toothed plate, which can be brought into engagement with a corresponding mating toothing on the locking part, which produces a detachable form-fitting connection acting in the direction of the longitudinal axis. The fact that the locking part is released from the engagement part, for example by the toothings being disengaged, so that the actuating unit together with energy absorbing device can be adjusted relative to the support unit in the direction of the longitudinal axis, so that longitudinal adjustment of the steering column is implemented.

In order to permit adjustability of the actuating unit relative to the support unit, provision can be made for a clamping device to be arranged on the support unit, which fixes the actuating unit relative to the support unit, at least in the longitudinal direction, when in the fixing position and, in the release position, enables adjustment of the actuating unit relative to the support unit, at least in the longitudinal direction. It is advantageous that the clamping device cooperates with the locking part which, in the fixing position, is connected to the engagement unit and, in the release position, is released from the engagement part. As a result, the steering column can be configured to be adjusted in the longitudinal and/or vertical direction. By means of the securing of the energy absorbing element according to the invention, optimal adaptation to the structural conditions can be carried out, a high safety standard being ensured The invention further comprises an actuating unit for a steering column of a motor vehicle, having a steering spindle which is mounted such that it can be rotated about its longitudinal axis in a casing tube, and an energy absorbing device which is connected to the casing tube, and which has an energy absorbing element fixed to the casing tube, wherein the energy absorbing element has an extended hole oriented parallel to the longitudinal axis (L), wherein the energy absorbing element is connected to the casing tube via at least one securing element, which engages in a form-fitting manner in securing recesses of the energy absorbing element and of the casing tube.

The actuating unit can be configured according to the features described above for the steering column, by which means the advantages outlined can be achieved when used in a steering column.

Figure 2:
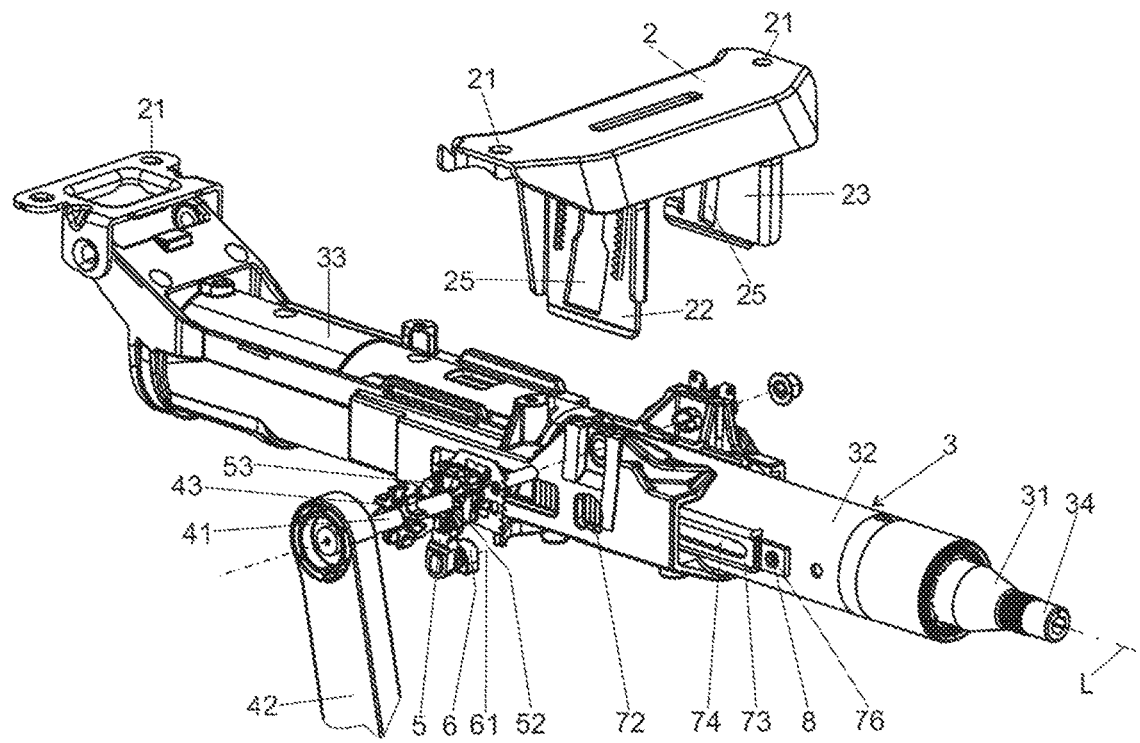
FIG. 2 is a partially-exploded view of the steering column of FIG. 1.

FIGS. 1 and 2 show, in a perspective view obliquely from behind—based on the direction of travel of a motor vehicle not shown here—a steering column 1, which has a support unit 2, having securing means 21 for connection to the body of the motor vehicle, for example securing openings as illustrated. From the support unit 2, two mutually opposite side cheeks 22 and 23 extend downward.

An actuating unit 3 comprises a steering spindle 31, which is mounted such that it can be rotated about its longitudinal axis L in an inner casing tube 32. The casing tube 32 is accommodated such that it can be displaced longitudinally in the direction of the longitudinal axis L in an outer casing tube 33, as indicated schematically by a double arrow. At the rear end in relation to the direction of travel, the steering spindle 31 has a securing section 34 for the co-rotational attachment of a steering wheel, not shown.

The casing unit 33 is supported on the support unit 2 such that it can be pivoted about a pivot axis 24 which is located transversely with respect to the longitudinal axis L. As a result, the actuating unit 3 can be pivoted up and down in the vertical direction H relative to the support unit 2 between the side cheeks 22 and 23 to adjust the vertical position of the steering wheel, as indicated by a double arrow.

A clamping device 4 is designed to clamp the actuating unit 3 optionally in the fixing position relative to the support unit 2 or in a release position to permit an adjustment in the direction of the longitudinal axis L and/or in the vertical direction H.

The clamping device 4 has a clamping pin 41 as an actuating element, which extends transversely with respect to the longitudinal direction L through elongated holes 25 in the mutually opposite side cheeks 22 and 23. The elongated holes 25 are extended in the vertical direction H. At one end of the clamping pin 41, an actuating lever 42 is co-rotationally fitted, while the other end is mounted on the side cheek 23 such that it can rotate but is resistant to tension.

Co-rotationally connected to the actuating lever 42 is a lifting disk 43, which is formed as a cam disk with cams protruding at the front end in the axial direction of the clamping pin 41, i.e. the clamping axis S, axially from outside against the side cheek 22.

On the clamping pin 41, between the lifting disk 43 and the outer side of the side cheek 22, there is arranged a fixing element 5. An opening 52 extends in the direction of the clamping axis S through the fixing element 5, through which opening the clamping pin 41 is led, as can be seen in FIG. 2.

The fixing element 5 has a pressure disk 53 formed as a cam disk. This has a basic form in the shape of a circular disc and is arranged coaxially with respect to the opening 52. On its axial front face which, when assembled, faces the lifting disk 43, the pressure disk 53 has axially protruding cams. The cams cooperate with the corresponding cams of the lifting disk 43 attached to the actuating lever 42 in order to form a lifting mechanism. For the purpose of fixing, the clamping pin 41 is rotated about its axis by means of an actuating lever 42 or alternatively by means of a motor drive, not illustrated. The fixing element 5 is held firmly with respect to rotation on the side cheek 22. As a result, the lifting disk 43 and the pressure disk 53 execute a relative movement in the axial direction of the clamping pin 41, so that the pressure disk 53 and therefore the fixing element 5 is pressed against the side cheek 22 from outside, transversely with respect to the longitudinal axis L. As a result, the casing unit 33 and therefore the actuating unit 3 is clamped in and trapped between the side cheeks 22 and 23.

Attached to the actuating unit 3 is an energy absorbing device 7, which has a transmission element 71 that has a toothed plate 72 with a toothing on the outside, the teeth lying transversely with respect to the longitudinal axis L.

Attached to the fixing element 5 is a locking part 6 in the form of a toothed block which, on its side directed toward the actuating unit 3, has toothing 61. The locking part 6 projects through the elongated hole 25 in the radial direction from outside and engages in a form-fitting manner with its toothing in the corresponding toothing of the toothed plate 72 on the transmission element 71 of the energy absorbing device 7. The engagement takes place as the clamping device 4 is clamped in the direction of the clamping axis S. As a result, form-fitting fixing of the casing tube 32 in the longitudinal direction L relative to the fixing element 5 is effected, the latter in turn being supported in the longitudinal direction L on the side cheek 22 of the support unit 2, so that the casing tube 32 is locked relative to the support unit 2 in the direction of the longitudinal axis L. By means of the locking part 6, the transmission element 7 of the energy absorbing device 7 is fixed to the support element 2 in the direction of the longitudinal axis L.

The energy absorbing device 7 is explained in detail in FIGS. 3 to 6.

The energy absorbing device 7 has an energy absorbing element 73, which has on its outside an elongated hole 74, which extends in the axial direction parallel to the longitudinal axis L. The elongated hole 74 is formed in a deformation section 75 of the energy absorbing element 7, which has a (radial) spacing A (see FIG. 6) from the outer surface of the casing tube 32. At its ends located in the direction of the longitudinal axis L, securing sections in the form of securing lugs 76 are attached, each of which has a radially continuous opening 761 as a securing recess. The securing lugs 76 extend parallel to the outer surface of the casing tube 32 and, angled over in the manner of steps, are attached to the deformation section 75, so that, when mounted according to FIGS. 3 and 4, they bear on the outside of the casing tube 32.

The fixing lugs 76 project from the deformation section 75 in the direction of the longitudinal axis L, and the openings 761 formed therein have a spacing from the elongated hole 74, that is to say are located outside the deformation section 75.

Corresponding openings 35 that are congruent with the openings 761 are introduced into the casing tube 32. For fixing, a respective rivet 8 used as a securing element is led through the openings 761 and 35 and riveted. As a result, a non-detachable connection of the energy absorbing element 73 to the actuating unit 3 is produced.

Figure 6:
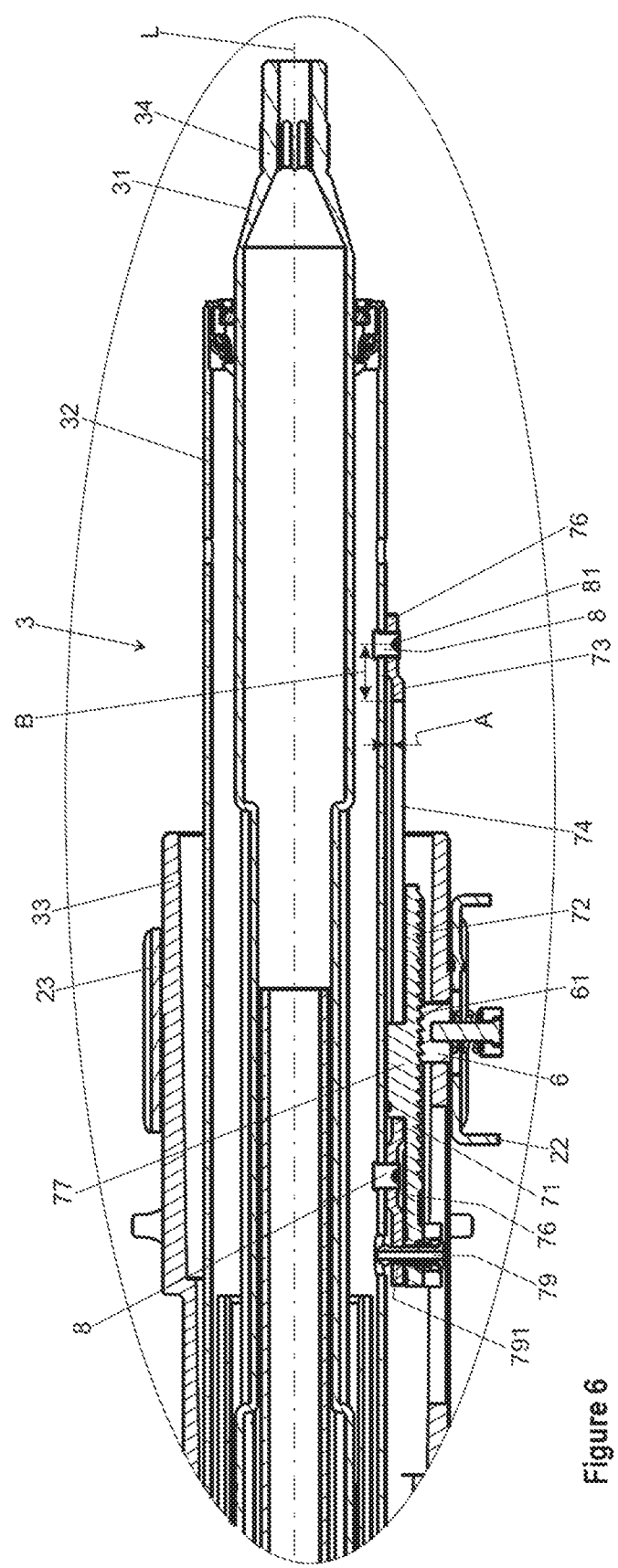
FIG. 6 is a longitudinal sectional view through the steering column of FIG. 1.

The plastic deformation for riveting the rivets 8 can preferably be carried out in such a way that a flush termination with the outer side of the securing lug 76 is achieved, for example by means of an indentation 81, as can easily be seen in the sectional illustration of FIG. 6.

The energy absorbing element 73 further has form-fitting elements 78 which engage in a form-fitting manner in corresponding form-fitting openings 36, slot-like in the example shown, in the casing tube 32.

By means of the outwardly protruding securing lugs 76, the energy absorbing element 73 is given a flange-like structure with respect to the securing to the casing tube 32. The fact that the deformation section 75 having the elongated hole 74 has a spacing B (see FIG. 6) from the rivets 8 in the direction of the longitudinal axis L means that particularly beneficial force absorption with respect to high forces introduced into the deformation section 75 in the event of a crash is ensured.

Figure 3:
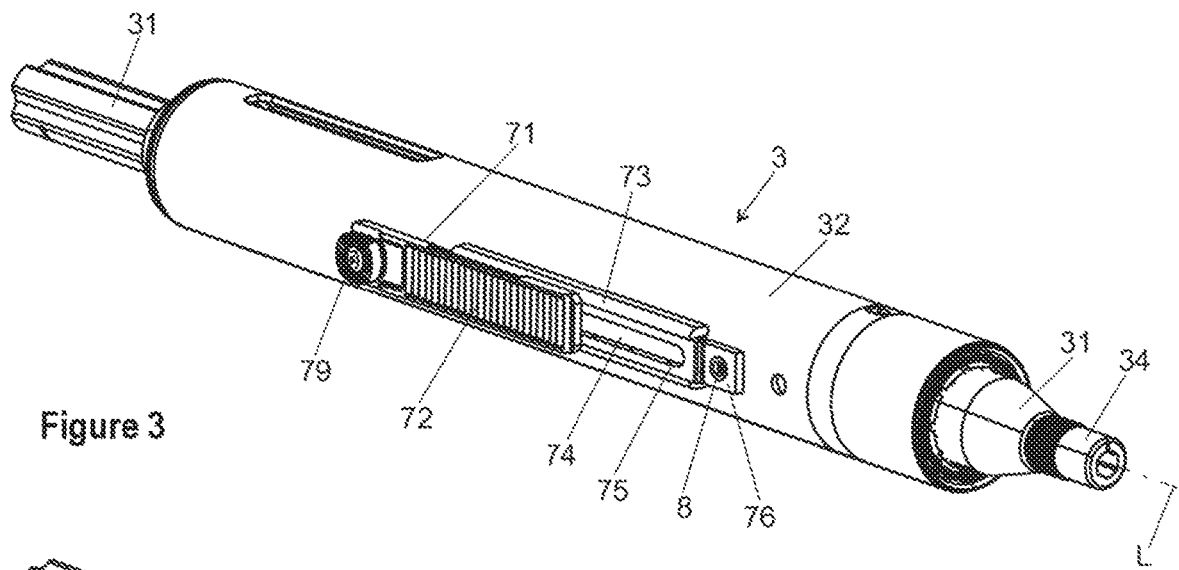
FIG. 3 a schematic perspective view of an example actuating unit of the steering column of FIG. 1.
Figure 4:
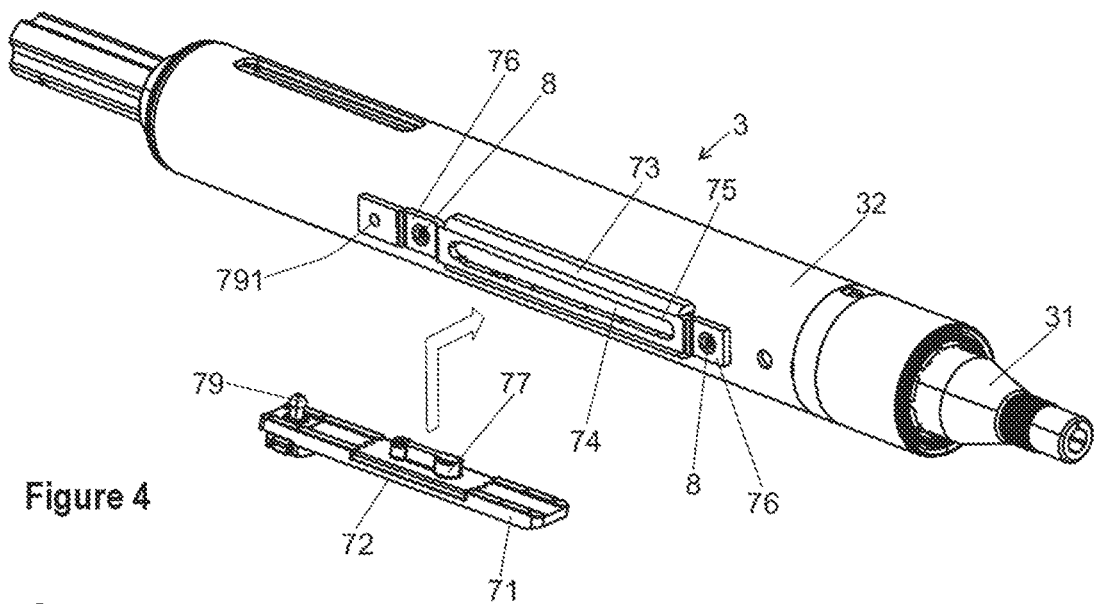
FIG. 4 is a partially-exploded view of the actuating unit of FIG. 3.
Figure 5:
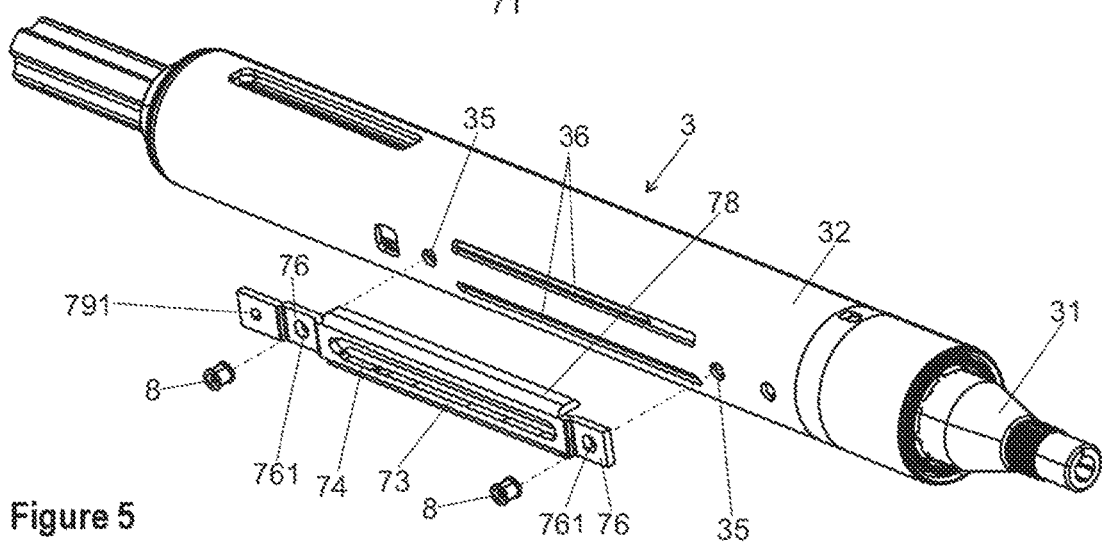
FIG. 5 is another exploded view of the actuating unit of FIG. 4.

The transmission element 71 has, on its inner side directed toward the casing tube 31, a projecting expansion part 77 formed as a deformation member, which dips into the elongated hole 75 in the mounted state of FIG. 3. The expansion part 77 is oversized relative to the width of the elongated hole (measured transversely with respect to the longitudinal axis L), so that a relative movement of the transmission element 71 toward the energy absorbing element 73 in the event of a crash effects plastic expansion of the elongated hole 75, which means that kinetic energy is absorbed in the deformation section 75 along the deformation path defined by the length of the elongated hole 75.

The transmission element 71 has an intended fracture element in the form of a shear pin 79 which, in the assembled operating state, engages in a form-fitting manner in a corresponding opening 791 in the energy absorbing part 73. The shear pin 79 can consist of a material that can be severed in a defined manner, for example aluminum or plastic, and is severed by the high force peaks occurring in the event of a crash, so that the relative movement of transmission element 71 and energy absorbing element for the energy absorption 73 along the elongated hole 74 is enabled.

In the sectional view of FIG. 6, it is easy to see how the locking part 6 supported on the side cheek 22 engages in the toothing of the toothed plate 72. It can likewise clearly be seen that the energy absorbing element 73 has, in the region of the elongated hole 74, a spacing A from the outer side of the casing tube 32, while the securing lugs 76 bear on the outside of the casing tube 32.

The energy absorbing element 73 can be produced logically as a one-piece sheet metal part by pressing, punching and bending, preferably from sheet steel.

LIST OF DESIGNATIONS

1 Steering column
2 Support unit
21 Securing means
22, 23 Side cheeks
24 Pivot axis
25 Elongated hole
3 Actuating unit
31 Steering spindle
32 Casing tube
33 Casing unit
34 Securing section
35 Opening
36 Form-fitting opening
4 Clamping device
41 Clamping pin
42 Actuating lever
43 Lifting disk
5 Fixing element
52 Opening
53 Pressure disk
6 Locking part (toothed block)
61 Toothing
7 Energy absorbing device
71 Transmission element
72 Toothed plate
73 Energy absorbing element
74 Elongated hole
75 Deformation section
76 Securing lug
761 Opening
77 Expanding part 78 Form-fitting element
79 Shear pin
791 Opening
8 Rivet
81 Indentation
L Longitudinal axis
H Vertical direction
S Clamping axis
A, B Spacing

What is claimed is:

1. A steering column for a motor vehicle, the steering column comprising:
    an actuating unit with a steering spindle that is mounted such that the steering spindle is rotatable about its longitudinal axis in a casing tube;
    a support unit that is connectable to a body of the motor vehicle, the support unit configured to receive the actuating unit; and
    an energy absorbing device that includes
        a transmission element that is supportable on the support unit, and
        an energy absorbing element that is secured to the actuating unit via a securing element that engages in securing recesses of the energy absorbing element and of the casing tube, wherein the energy absorbing element includes an elongated hole parallel to the longitudinal axis, wherein an expansion part of the transmission element that is oversized relative to a width of the elongated hole engages into the elongated hole,
        wherein in a crash event the transmission element is movable in a direction of the longitudinal axis relative to the energy absorbing element with plastic deformation of the energy absorbing element.

2. The steering column of claim 1 wherein the securing element is a plastically deformable, non-detachable connecting element.

3. The steering column of claim 1 wherein the securing element is one of at least two securing elements that are disposed on a line parallel to the longitudinal axis.

4. The steering column of claim 3 wherein the at least two securing elements are disposed on a securing section of the energy absorbing element, outside a deformation section.

5. The steering column of claim 1 wherein the elongated hole is radially spaced apart from the casing tube, wherein at least one of the securing recesses is disposed in a securing lug lying against the casing tube.

6. The steering column of claim 1 wherein the energy absorbing element includes a form-fitting element that engages in a form-fitting manner in a corresponding form-fitting recess in the casing tube.

7. The steering column of claim 1 wherein the transmission element and the energy absorbing element are connected via a fracture element.

8. The steering column of claim 7 wherein the fracture element is configured to fracture in a crash event.

9. The steering column of claim 1 wherein the transmission element includes an engagement part that is detachably connectable to a locking part that is configured to be supported on the support unit.

10. The steering column of claim 1 comprising a clamping device disposed on the support unit that fixes the actuating unit relative to the support unit at least in the longitudinal direction in a fixing position, wherein in a release position the clamping device enables adjustment of the actuating unit relative to the support unit at least in the longitudinal direction.

11. The steering column of claim 10 wherein the transmission element includes an engagement part that is detachably connectable to a locking part that is configured to be supported on the support unit, wherein the clamping device cooperates with the locking part, which in the fixing position is connected to the engagement part and which in the release position is released from the engagement part.

12. An actuating unit for a steering column of a motor vehicle, the actuating unit comprising:
    a steering spindle that is rotatably mounted about its longitudinal axis in a casing tube;
    an energy absorbing device that is connectable to the casing tube, the energy absorbing device including an energy absorbing element fixed to the casing tube, wherein the energy absorbing element has an extended hole parallel to the longitudinal axis; and
    a securing element that connects the energy absorbing element to the casing tube, the securing element engaging in a form-fitting manner in securing recesses of the energy absorbing element and of the casing tube.

* * * * *